United States Patent [19]
Thoman et al.

[11] Patent Number: 5,857,414
[45] Date of Patent: *Jan. 12, 1999

[54] COMPOSITE BOX STRUCTURE FOR A RAILWAY CAR

[75] Inventors: Mell R. Thoman, Carrollton; John W. Coulborn, Fort Worth, both of Tex.

[73] Assignee: TRN Business Trust, Dallas, Tex.

[*] Notice: The term of this patent shall not extend beyond the expiration date of Pat. No. 5,765,485.

[21] Appl. No.: 684,564

[22] Filed: Jul. 19, 1996

Related U.S. Application Data

[60] Provisional application Nos. 60/001,348 Jul. 21, 1995, 60/001,347 Jul. 21, 1995 and 60/001,346 Jul. 21, 1995.

[51] Int. Cl.$^6$ .................................................. B61D 17/00
[52] U.S. Cl. .......................................... 105/397; 105/401
[58] Field of Search .................................. 105/355, 396, 105/397, 401, 402, 404, 409, 410, 413, 416, 418, 417, 419, 422, 423; 296/901, 183, 181, 39.3, 24.1, 900; 220/1.5, 4.01, 4.21, 645

[56] References Cited

U.S. PATENT DOCUMENTS

| | | |
|---|---|---|
| 709,894 | 9/1902 | Ferrell . |
| 1,133,335 | 3/1915 | Summers . |

(List continued on next page.)

FOREIGN PATENT DOCUMENTS

| | | | |
|---|---|---|---|
| 232242 | 6/1959 | Australia ............................. | 105/397 |
| 145249 | 12/1980 | Germany ............................. | 105/401 |
| 3911138 | 10/1990 | Germany . | |

OTHER PUBLICATIONS

Shippers' Problems . . . Trinity's Solution?, Trinity Industries, Inc. advertisement, no date.
"Trinity Steel Box Car Key Features", specification sheet, no date.
Letter from American Composite Inc., Aug. 27, 1997.
List of products from American Composite Inc., no date.
Co–pending application No. 08/859,671 entitled *Insulated Composite Railway Boxcar and Method* filed May 20, 1997 (Attorney's Docket 091078.0587).
Co–pending application No. 08/859,575 entitled *Insulated Composite Railway Boxcar* filed May 20, 1997 (Attorney's Docket 091078.0588).
Co–pending application No. 08/986,187 entitled *Railway Car Underframe for an Insulated Composite Boxcar* filed Dec. 5, 1997 (Attorney's Docket 091078.0650).
G. Welty "New Design, New Materials, Freight Cars", Railway Age, Feb. 1994, p. 39.
M. Gabriele, "Pultrusion's Promise", Plastics Technology, Mar. 1995, p. 36.
"FRP Goes After Intermodel Container Market", Plastics World, Oct. 1993, p. 16.
Brochure, "'Stoughton Composites, Inc. Introduces Lightweight Refrigerated Domestic Containers'", Stoughton Composites, Dec. 1993, pp. 1–10.
Drawing, "Car Body Assembly" GRAAFF GmbH May 1994, p. 1.

(List continued on next page.)

*Primary Examiner*—Mark T. Le
*Attorney, Agent, or Firm*—Baker & Botts, L.L.P.

[57] ABSTRACT

A composite box structure having a core encapsulated in multiple layers of fiber reinforced plastic is provided. The core may be formed from various materials which provide improved resistance to heat transfer between the interior and the exterior of the composite box structure. The composite box structure includes a pair of end walls, a pair of side walls, a floor and a roof with fiber reinforced plastic interior and exterior surfaces. An opening is formed in each side wall to allow access to the interior of the composite box structure. A flexible hinge or joint is integrally molded between each end wall and the respective side walls and between each end wall and the floor. The composite box structure may be mounted on a railway car underframe to provide an insulated composite railway boxcar.

26 Claims, 8 Drawing Sheets

5,857,414
Page 2

U.S. PATENT DOCUMENTS

| | | | |
|---|---|---|---|
| 1,170,129 | 2/1916 | Weaver . | |
| 1,749,473 | 3/1930 | Des Islets . | |
| 2,620,226 | 12/1952 | Jones | 298/27 |
| 2,635,559 | 4/1953 | Nystrom et al. | 105/416 |
| 2,783,718 | 3/1957 | Cheshire | 105/419 |
| 2,788,750 | 4/1957 | Priest | 105/406 |
| 3,057,284 | 10/1962 | Learmont | 410/135 |
| 3,100,458 | 8/1963 | Baker et al. | 105/397 |
| 3,175,520 | 3/1965 | Talmey | 220/1.5 |
| 3,252,430 | 5/1966 | Eckhardt et al. | 105/397 |
| 3,266,441 | 8/1966 | Pulcrano | 105/416 |
| 3,563,403 | 2/1971 | Luisada | 220/1.5 |
| 3,599,575 | 8/1971 | Yurkoski et al. | 105/358 |
| 3,616,764 | 11/1971 | Johnson et al. | 105/366 |
| 4,076,166 | 2/1978 | Austill | 228/157 |
| 4,209,892 | 7/1980 | Hofstaedter et al. | 105/401 |
| 4,226,189 | 10/1980 | Bertolini | 105/423 |
| 4,230,048 | 10/1980 | Gordon et al. | 105/248 |
| 4,275,662 | 6/1981 | Adler et al. | 105/377 |
| 4,286,507 | 9/1981 | Dorpmund | 98/32 |
| 4,292,898 | 10/1981 | Gordon et al. | 105/238 |
| 4,422,558 | 12/1983 | Mitelmann et al. | 220/1.5 |
| 4,469,541 | 9/1984 | Goldsworthy | 156/180 |
| 4,474,632 | 10/1984 | Spees | 156/78 |
| 4,497,258 | 2/1985 | Ruhmann et al. | 105/248 |
| 4,498,941 | 2/1985 | Goldsworthy | 156/148 |
| 4,608,931 | 9/1986 | Ruhmann et al. | 105/248 |
| 4,902,215 | 2/1990 | Seemann, III | 425/406 |
| 4,904,017 | 2/1990 | Ehrlich | 296/181 |
| 4,998,637 | 3/1991 | Marovskis | 220/1.5 |
| 5,042,395 | 8/1991 | Wackerle et al. | 105/397 |
| 5,050,402 | 9/1991 | Graaff | 62/457.9 |
| 5,052,906 | 10/1991 | Seemann | 425/112 |
| 5,114,516 | 5/1992 | Pilling et al. | 156/180 |
| 5,168,717 | 12/1992 | Mowatt-Larssen | 62/239 |
| 5,201,432 | 4/1993 | Jensen | 220/1.5 |
| 5,246,321 | 9/1993 | Hesch | 410/58 |
| 5,255,806 | 10/1993 | Korzeniowski et al. | 220/1.5 |
| 5,265,748 | 11/1993 | Furukawa | 220/1.5 |
| 5,299,405 | 4/1994 | Thompson | 52/795 |
| 5,316,462 | 5/1994 | Seeman | 425/112 |
| 5,320,046 | 6/1994 | Hesch | 105/413 |
| 5,362,345 | 11/1994 | Stettler et al. | 105/397 |
| 5,370,482 | 12/1994 | Long | 410/153 |
| 5,373,792 | 12/1994 | Pileggi et al. | 105/406 |
| 5,383,406 | 1/1995 | Vanolo et al. | 105/401 |
| 5,386,674 | 2/1995 | Sfirakis et al. | 52/243.1 |
| 5,392,717 | 2/1995 | Hesch et al. | 105/404 |
| 5,403,062 | 4/1995 | Sjostedt et al. | 296/181 |
| 5,403,063 | 4/1995 | Sjostedt et al. | 296/187 |
| 5,449,081 | 9/1995 | Sjostedt et al. | 220/1.5 |
| 5,450,977 | 9/1995 | Moe | 220/1.5 |
| 5,458,066 | 10/1995 | Ishida et al. | 105/397 |
| 5,601,034 | 2/1997 | Tao et al. | 105/423 |
| 5,690,378 | 11/1997 | Romesburg | 296/181 |

OTHER PUBLICATIONS

Catalogue Item, "Durashield® Foam Core Building Panels", Ryerson Plastics Catalogue No. 21, 1992, p. 112.

Single Page: "Freight Cars: Mechanical Refrigerator." Pacific Fruit Express, p. 135, (no date).

Manual: "Equipment Diagram for Unrestricted Interchange Service." Association of American Railroads Mechanical Division, Aug. 1991, pp. C–240–C–256.2.

Article: "A better boat, a greener boatworks." SAIL Magazine, Aug. 1993, pp. 27–29.

Brochure: "Simply . . . Making it Easier to Ship Your Frozen Foods." General American Transportation Corporation, (no date).

Brochure: "Scrimp Systems . . . Composite performance and quality." Dupont, Deleware Technology Park.

Catalog pages from General American Transportation Corporation on Gatx Arcticar (8 pages), (no date).

Catalog pages from Stoughton Composites, Inc. on Domestic Container (5 pages) (no date).

Catalog pages from Pullman–Standard, Division of Pullman Incorporated, on Foamed–in–Place Insulated Box Cars (5 pages), (no date).

Catalog pages from Pacific Car and Foundry Company (19 pages), (no date).

Catalog page on C.H. Robinson 48–foot domestic container, (no date).

Catalog pages from GRAAFF GmbH on "Sandwich Technology for Refrigerated and Insulated Transport Equipment" May 1994 (9 pages).

Miscellaneous pages from *Introduction to Composites on Constituents of Composites,* (20 pages).

Co–pending application No. 08/684,345 entitled *Insulated Composites Railway Boxcar and Method* filed concurrently (Attorney's Docket 091078.0444).

Co–pending application No. 08/684,537 entitled *Load Divider Assembly and Door Assembly for a Composite Railway Boxcar* filed concurrently (Attorney's Docket 091078.0447).

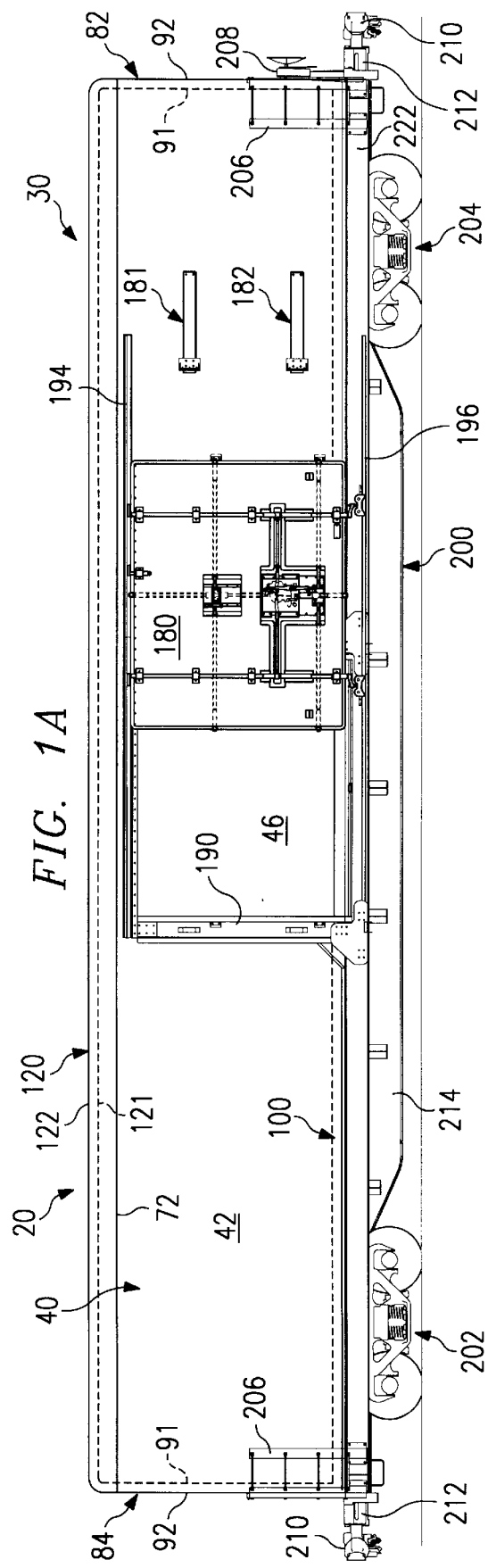
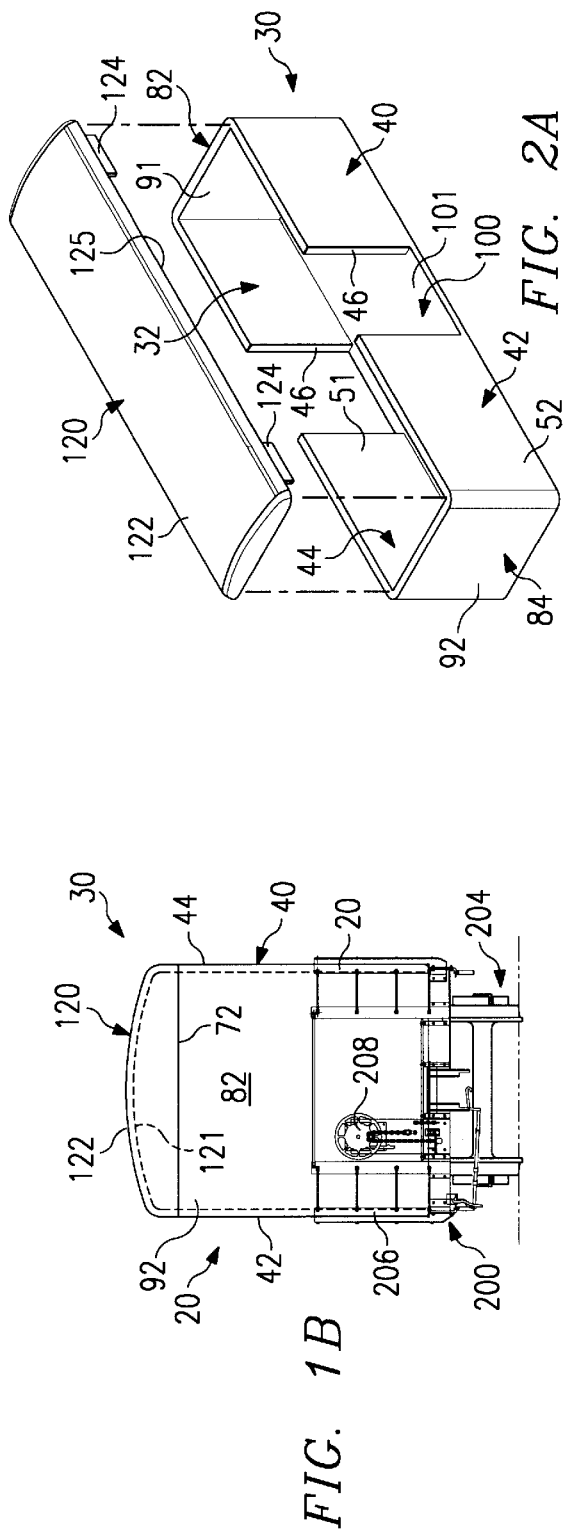

COMPOSITE BOX STRUCTURE FOR A RAILWAY CAR

RELATED APPLICATIONS

This application claims the benefit of U.S. Provisional Application No. 60/001,348, filed Jul. 21, 1995; U.S. Provisional Application No. 60/001,347, filed Jul. 21, 1995 and U.S. Provisional Application No. 60/001/346, filed Jul. 21, 1995.

This application is related to co-pending application entitled *Insulated Composite Railway Boxcar and Method*, filed on Jul. 19, 1996, Ser. No. 08/684,345, now U.S. Pat. No. 5,765,485, and co-pending application entitled *Load Divider Assembly and Door Assembly for a Composite Railway Boxcar*, filed on Jul. 19, 1996, Ser. No. 08/684,537, allowed.

TECHNICAL FIELD OF THE INVENTION

This invention relates generally to a composite box structure and more particularly to a composite box structure which may be used in the manufacture of various types of railway cars.

BACKGROUND OF THE INVENTION

Over the years, general purpose railway boxcars have progressed from relatively simple wooden structures mounted on flat cars to more elaborate arrangements including insulated walls and refrigeration equipment. Various types of insulated railway boxcars are presently manufactured and used. A typical insulated railway boxcar includes an enclosed structure mounted on a railway car underframe. The enclosed structure generally has an outer shell, one or more layers of insulation and interior paneling. The outer shell of such railway boxcars often has an exterior surface formed from various types of metal such as steel or aluminum. The interior paneling is often formed from wood and/or metal as desired for the specific application. For some applications the interior paneling has been formed from fiber reinforced plastic (FRP). Various types of sliding doors including plug type doors are generally provided on each side of conventional railway boxcars for loading and unloading freight. Conventional railway boxcars are assembled from various pieces of wood, steel and/or sheets of composite materials such as fiberglass reinforced plastic. Significant amounts of raw material, labor and time are often required to complete the manufacture and assembly of conventional railway boxcars.

The underframe for many railway boxcars include a center sill with a pair of end sills and a pair of side sills arranged in a generally rectangular configuration corresponding approximately with the dimensions for the floor of the railway boxcar. Cross bearers and cross ties are provided to establish the desired rigidity and strength for transmission of vertical loads from the side sills to the center sill and for dissipating horizontal end loads on the center sill to other portions of the underframe. A plurality of longitudinal stringers are also provided on each side of the center sill to support the floor of the enclosed structure. Examples of such railway car underframes are shown in U.S. Pat. Nos. 2,783,718 and 3,266,441.

For many years various techniques have been used to build fiberglass boat hulls. Many of these hulls have been fabricated using wet layup techniques in which each layer of material such as fiberglass or carbon fiber is first wetted with the desired resin such as polyester or vinylester and then laid in an open mold. Recently, vacuum bagging techniques have been combined with wet layup techniques to control the emission of volatile organic compounds. Vacuum bagging also produces a stronger structure by eliminating air pockets and excess resin in the finished product.

More recently, vacuum bagging techniques have been combined with an enhanced resin delivery system which allows the use of a closed molding system and dry layup of core layers and fiber reinforcing layers such as fiberglass in the mold. This process may sometimes be referred to as composite resin infusion molding. U.S. Pat. Nos. 4,902,215; 5,052,906 and 5,316,462 provide additional information concerning this type of vacuum bagging process to form a fiberglass reinforced composite article.

Various types of load dividers and freight securing systems have previously been used to prevent undesired movement of freight contained within a railway boxcar. The use of such systems is particularly important when a railway boxcar is only partially loaded. Examples of such systems are shown in U.S. Pat. No. 5,370,482 entitled *"Cargo Securement System"* and U.S. Pat. No. 5,386,674 entitled *"Two Piece Bulkhead Door for Rail Cars and the Like."* All patents noted in the Background of the Invention are incorporated by reference for all purposes within this application.

SUMMARY OF THE INVENTION

In accordance with the present invention, disadvantages and problems associated with previous insulated railway boxcars have been substantially reduced or eliminated. The present invention provides a composite box structure for a railway boxcar having enhanced insulation, reduced weight, increased capacity and increased service life as compared to a typical boxcar. A composite box structure incorporating teachings of the present invention allows assembly of the resulting railway boxcar with similar or reduced costs as compared to conventional railway boxcars with the same performance characteristics.

One aspect of the present invention includes a composite box structure having a pair of side walls, end walls and a floor fabricated as a single unit using vacuum bagging techniques along with dry layup of selected material layers and an enhanced resin delivery system. Openings are provided in the side walls during the molding process to correspond with the desired location of doors for the resulting railway boxcar. A roof may be molded as a single unit using the same materials and techniques as the side walls, end walls and floor.

Technical advantages of the present invention include providing a composite box structure having completely flush interior and exterior surfaces with no seams and no metal fasteners extending throughout the enclosed structure. Internal supporting beams are formed within the side walls from the same composite materials used to mold the walls, floor and roof. The floor has a completely flush interior surface with no seams or joints. The resulting composite box structure does not have any metal heat transfer paths between the exterior and the interior. Also, the resulting composite box structure is waterproof and highly corrosion resistant.

Further technical advantages of the present invention include providing a composite box structure having substantially reduced heat transfer characteristics resulting from selection of core materials with improved resistance to heat transfer and no seams or metal fasteners associated with assembly of the end walls, side walls and roof. For some applications, the composite box structure provides sufficient insulation to allow shipping frozen foods without requiring refrigeration equipment. By eliminating metal and other thermal energy transfer paths between the exterior and the interior of the composite box structure, the thickness of insulation materials can be reduced while providing substantially increased resistance to heat transfer between the exterior and the interior.

BRIEF DESCRIPTION OF THE DRAWINGS

For a more complete understanding of the present invention, and the advantages thereof, reference is now made to the following written description taken in conjunction with the accompanying drawings, in which:

FIG. 1A is a schematic drawing in elevation showing a side view of a railway car having a composite box structure incorporating one embodiment of the present invention;

FIG. 1B is an end view of the railway car of FIG. 1A;

FIG. 2A is a schematic drawing showing an exploded, isometric view of a first fiber reinforced composite unit and a second fiber reinforced composite unit which may be joined together to form the composite box structure of FIGS. 1A and 1B in accordance with one aspect of the present invention;

DETAILED DESCRIPTION OF THE INVENTION

Figure 2B:
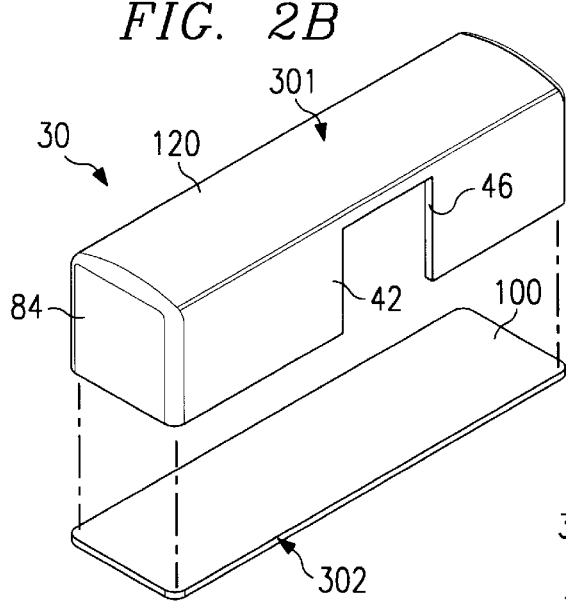
FIGS. 2B, 2C, and 2D are schematic drawings showing exploded, isometric views of first fiber reinforced composite units and second fiber reinforced composite units which may be joined together to form composite box structures in accordance with other aspects of the present invention.

The preferred embodiments of the present invention and its advantages are best understood by referring to FIGS. 1A through 12 of the drawings, like numerals being used for like and corresponding parts of the various drawings.

Insulated composite railway boxcar 20 incorporating teachings of the present invention is shown in FIGS. 1A and 1B with composite box structure 30 mounted on railway car underframe 200. As will be explained later in more detail, composite box structure 30 is preferably both adhesively bonded and mechanically engaged with railway car underframe 200. For the embodiment of the present invention shown in FIGS. 1A and 1B, railway boxcar 20 has exterior dimensions which satisfy the requirements of Plate C and associated structural design requirements of the Association of American Railroads (AAR). Forming composite box structure 30 from light weight composite materials in accordance with teachings of the present invention allows a reduction in the weight of railway boxcar 20 while at the same time increasing both the internal volume and the load carrying capacity of railway boxcar 20 as compared to a conventional insulated boxcar within Plate C requirements.

For one application, composite box structure 30 provides hollow interior 32 with dimensions of approximately sixty-eight feet in length, ten feet in width and twelve feet in height. For this application, railway boxcar 20 has a freight carrying capacity of approximately 6,291 cubic feet with a light weight of 86,000 pounds and a nominal load carrying capacity of 200,000 pounds which is very advantageous for an insulated railway boxcar satisfying the dimensional requirements of Plate C. Additional specifications for railway boxcar 20 are included at the end of this written description. As a result of the present invention, composite box structure 30 may be modified to accommodate various geometric configurations based on specific customer requirements concerning the size and type of freight that will be carried in the resulting railway boxcar 20.

For purposes of this patent application, the term "fiber reinforced plastic" is used to refer to composite materials composed of either a thermosetting or thermoplastic resin and fibers, filaments, or whiskers of material such as glass, metal, aramid, boron, carbon, aluminum silicate and other suitable ceramic materials. For purposes of this patent application, the term "resin" is used to include both naturally occurring and synthetic polymers which may be mixed with various additives such as fillers, colorants, plasticizers, and curing agents, to infuse or impregnate the selected fiber material to form the desired fiber reinforced plastic layers and surfaces during fabrication of composite box structure 30. For one application the fiber material preferably includes glass fibers typically associated with FIBERGLAS® products available from Owens-Corning.

Composite box structure 30 is preferably fabricated using vacuum bagging techniques which include dry lay up of selected core materials and multiple layers of the selected fiber materials in a closed molding system (not shown) along with an enhanced resin delivery system (not shown). Some of the benefits of using a closed molding system include the ability to fabricate a large number of composite box structures 30 from the same mold with dimensions that meet the selected AAR plate requirements and provide a smooth, aerodynamic exterior surface for the resulting railway boxcar 20.

Closed molding systems and enhanced resin delivery systems may be modified to form composite box structures 30 with various configurations and dimensions as required for the specific railway boxcar 20. U.S. Pat. Nos. 4,902,215; 5,052,906 and 5,316,462 show examples of vacuum bagging techniques satisfactory for use with the present invention. Composite resin infusion molding processes incorporating various features of these patents have been licensed to Hardcore DuPont Composites L.L.C. located at 42 Lukens Drive, New Castle, Del. Various types of composite structures molded in accordance with the teachings of these patents are available from Hardcore DuPont.

For the embodiment shown in FIGS. 1A, 1B, 2A, 3 and 10, composite box structure 30 is formed from first fiber reinforced composite unit 40 and second fiber reinforced composite unit 120. FIGS. 2B, 2C and 2D show alternative configurations of first and second fiber reinforced composite units which may be used to form composite box structure 30. Also, for some applications composite box structure 30 may be integrally molded as a single fiber reinforced composite unit.

First composite unit 40 includes a pair of opposite side walls 42 and 44, a pair of opposite end walls 82 and 84 and floor 100. Side walls 42 and 44 along with end walls 82 and 84 and floor 100 cooperate with each other to partially define hollow interior 32 of composite box structure 30. Hollow interior 32 corresponds with the interior of railway boxcar 20 in which various types of freight may be placed for shipment in railway boxcar 20. Second composite unit or roof 120 has dimensions corresponding with side walls 42 and 44 and end walls 82 and 84 to allow attaching roof 120 with end walls 82 and 84 and side walls 42 and 44 opposite from floor 100.

Side walls 42 and 44, end walls 82 and 84 and floor 100 are preferably integrally molded with each other using vacuum bagging techniques to form first fiber reinforced composite unit 40. Similar molding techniques may be used to form second fiber reinforced composite unit or roof 120. Both first composite unit 40 and second composite unit 120 preferably have a foam core covered or wrapped with multiple plies of fiber material which has been infused with a selected resin to encapsulate the foam core with one or more layers of fiber reinforced plastic. The multiple plies of fiber material and the selected resin also form fiber reinforced plastic interior surfaces and exterior surfaces for composite box structure 30. For some applications side walls 42 and 44, end walls 82 and 84, floor 100 and roof 120 may be integrally joined with each other by molding in a closed molding system (not shown) to form a single fiber reinforced composite unit as shown in FIG. 2E. Materials other than foam may be used to form the core.

As shown in FIG. 2A, end walls 82 and 84 extend between and are integrally molded with respective ends of side walls 42 and 44. Floor 100 extends between and is integrally molded with side walls 42 and 44 and end walls 82 and 84 to form first fiber reinforced composite unit 40. Second fiber reinforced composite unit or roof 120 is molded as a separate unit and mounted on side walls 42 and 44 and end walls 82 and 84 opposite from floor 100 to form composite box structure 30.

As illustrated in FIGS. 3, 6, 9, and 12, first layer 51 of fiber reinforced plastic is preferably disposed on the interior surface of each side wall 42 and 44. Second layer 52 of fiber reinforced plastic is preferably disposed on the exterior surface of each side wall 42 and 44. Each side wall 42 and 44 preferably includes foam core 53 encapsulated between layers 51 and 52 of fiber reinforced plastic.

Figure 7:
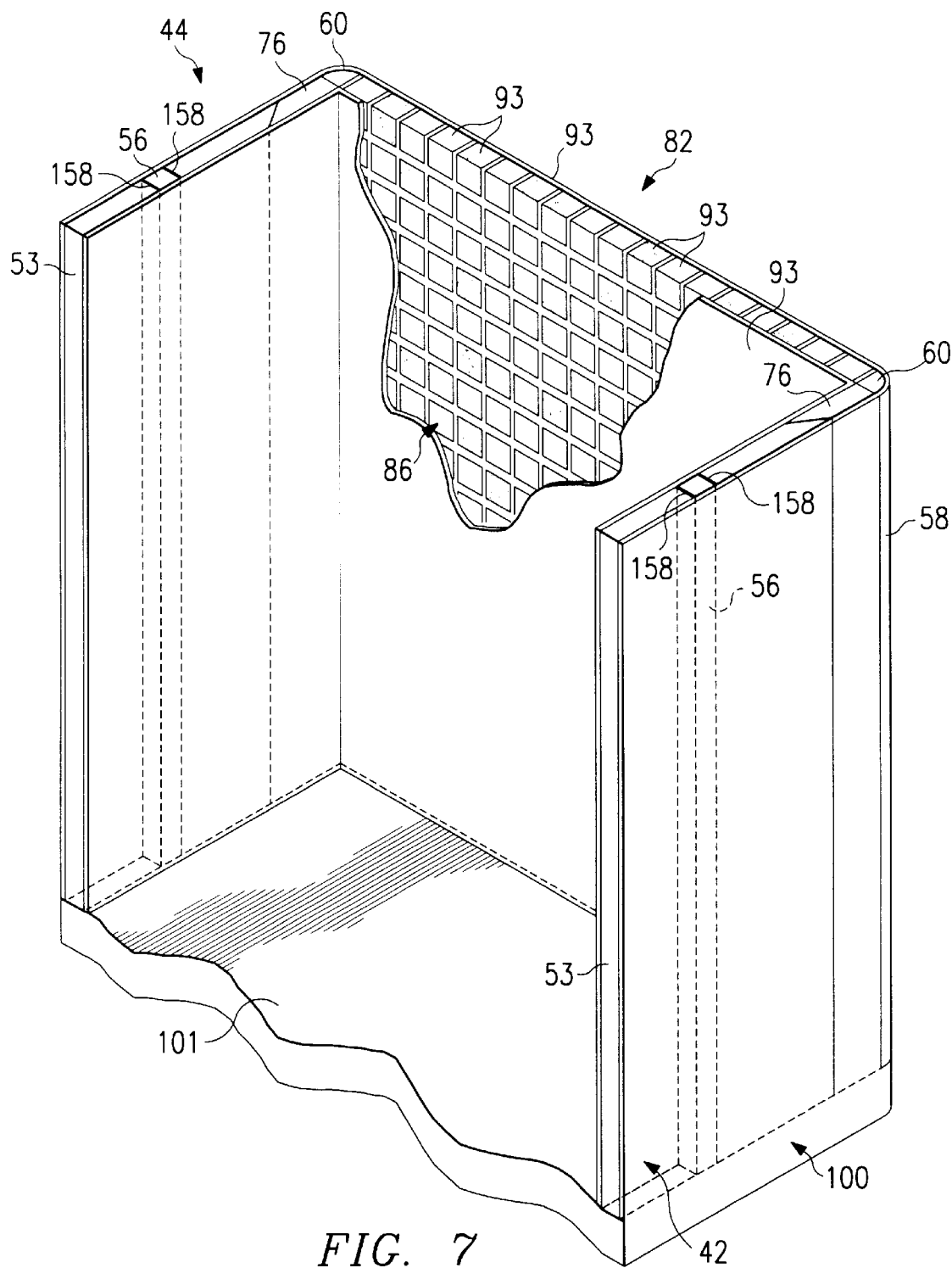
FIG. 7 is a schematic drawing in section and in elevation with portions broken away showing integrally molded connections between an end wall and a pair of opposite side walls in accordance with one aspect of the present invention.
Figure 8:
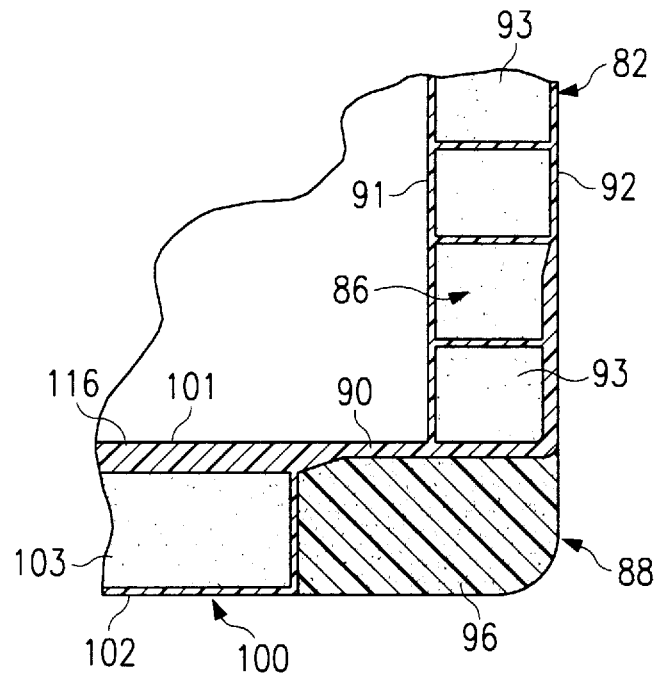
FIG. 8 is a schematic drawing in section and in elevation with portions broken away showing a flexible hinge or joint formed between a floor and an end wall in accordance with one aspect of the present invention.

In a similar manner as shown in FIGS. 7 and 8, first layer 91 of fiber reinforced plastic is preferably disposed on the interior surface of each end wall 82 and 84. Second layer 92 of fiber reinforced plastic is preferably disposed on the exterior surface of each end wall 82 and 84. Each end wall 82 and 84 includes foam core 93 encapsulated between layers 91 and 92 of fiber reinforced plastic. In a similar manner floor 100 includes foam cores 103 encapsulated between layers 101 and 102 of fiber reinforced plastic. Second composite unit or roof 120 also includes foam core 123 encapsulated between layers 121 and 122 of fiber reinforced plastic. As will be explained later in more detail the configuration of foam cores 53, 103 and 123 may be varied in accordance with the teachings of the present invention depending upon the requirements of the resulting railway boxcar 20.

As a result of the molding process first layers 51, 91 and 101 provide a continuous, smooth interior surface of fiber reinforced plastic for railway boxcar 20. In a similar manner exterior surfaces 52, 92 and 102 are integrally molded with each other to form a continuous, smooth exterior surface of fiber reinforced plastic for railway boxcar 20.

Foam cores 53, 93, 103 and 123 may be formed from various types of material such as urethane, polyurethane, styrene and polystyrene. For some applications cores 53, 93, 103 or 123 may be formed with light metal foam. Also, foam cores 53, 93, 103 and 123 may have various configurations such as foam blocks wrapped with one or more plies of a selected fiber material or layers of a selected foam material alternating with plies of a selected fiber material. For still other applications foam cores 53 and/or 103 may be replaced with light weight wood such as balsa wood or a heavier wood such as plywood.

The selected foam core and multiple plies of fiber material are placed in a closed molding system having the desired configuration for first composite unit 40 or second composite unit 120. A resin delivery system is used to infuse or impregnate the multiple plies of fiber material with the selected resin. Depending upon the intended application for the resulting railway boxcar 20, the fiber material may include carbon, boron, graphite, glass, aramid or a combination of these materials. Aramids such as KEVLAR® fibers and NOMEX® fibers available from E. I. DuPont De Nemours & Co. may be particularly useful in fabricating railway box cars. Other fiber materials may be satisfactorily used with the present invention. Again, depending upon the intended application for railway boxcar 20, the resin may be selected from a wide variety of polymers including epoxy, polyester, vinylester and vinyl. Also, other resins may be satisfactorily used with the present invention.

Figure 6:
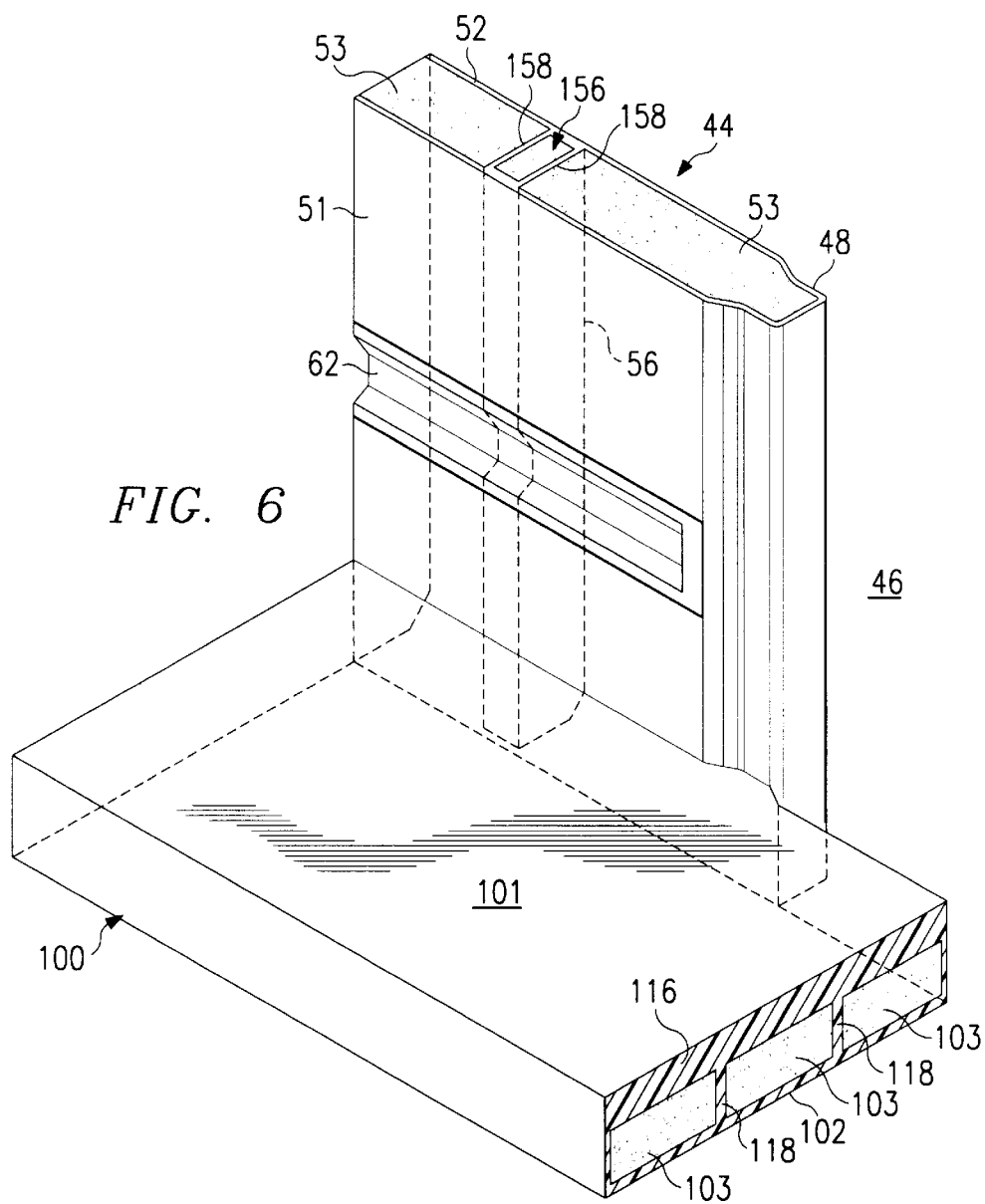
FIG. 6 is an isometric drawing with portions broken away showing a schematic view of a floor and side wall incorporating one embodiment of the present invention.
Figure 9:
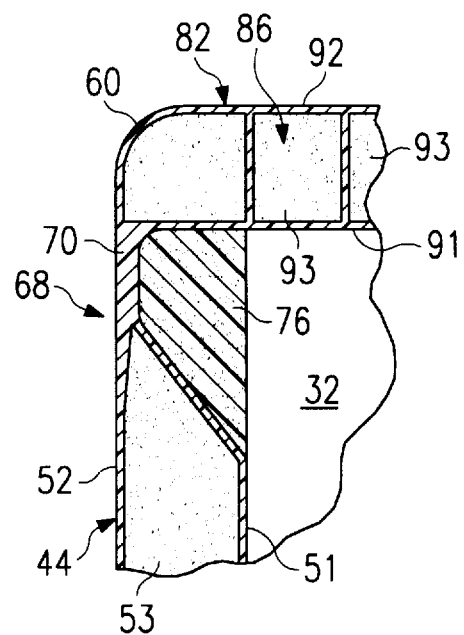
FIG. 9 is a schematic drawing in section and in elevation with portions broken away showing a flexible hinge or joint formed between a side wall and an end wall in accordance with one aspect of the present invention.
Figure 12:
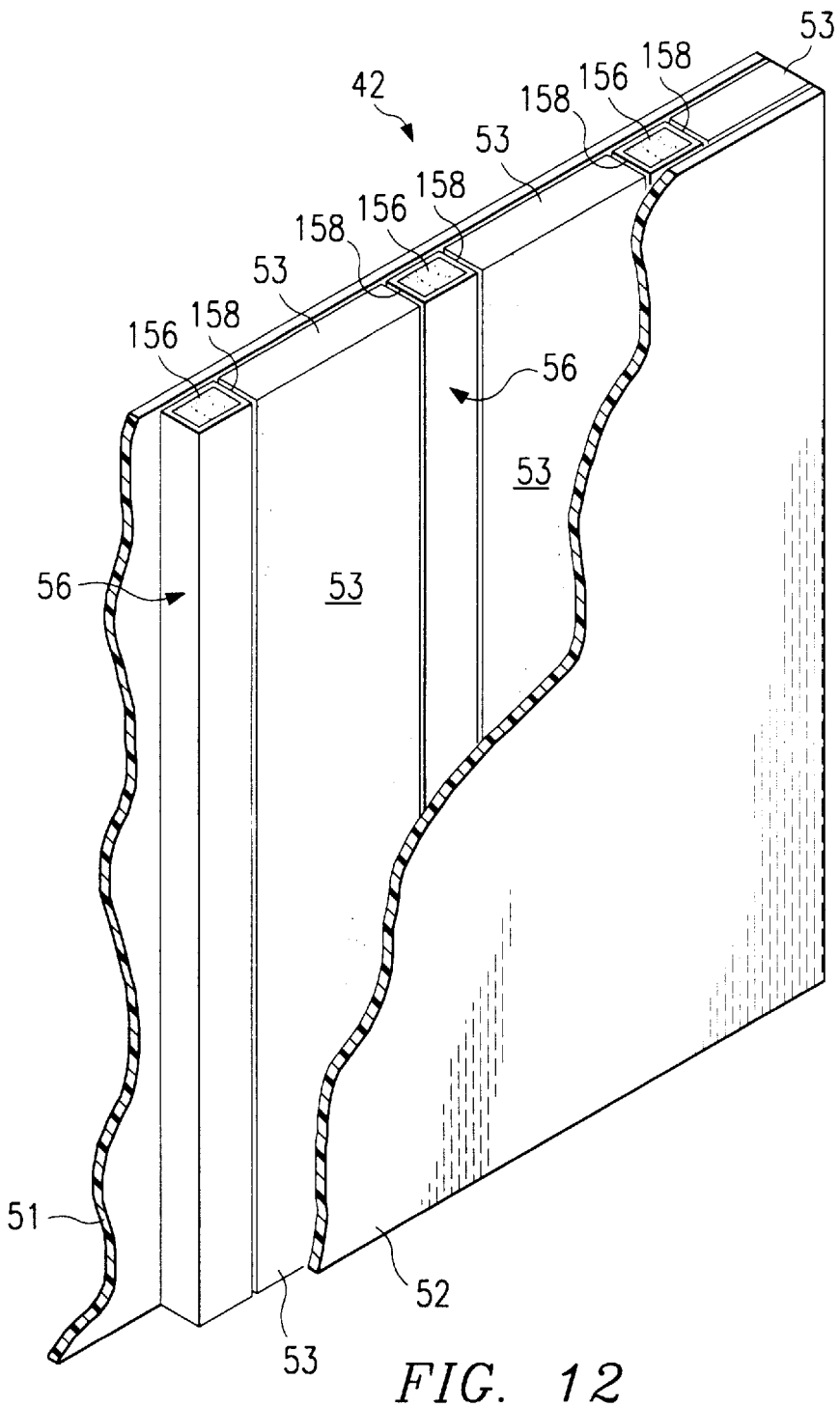
FIG. 12 is a schematic drawing in section and in elevation with portions broken away showing a side wall having foam blocks and internal vertical support beams in accordance with one embodiment of the present invention.

By properly selecting the type of material used to form foam cores 53, 93, 103 and 123 along with other teachings of the present invention which substantially reduce or minimize potential heat transfer paths, composite box structure 30 may have a heat transfer rate of approximately one hundred sixteen (116) BTUs per hour per degree Fahrenheit or less. As shown in FIGS. 6, 9, and 12 foam core 53 for side walls 42 and 44 may be formed from a plurality of foam blocks 53 which have been wrapped with the selected fiber material and impregnated with the selected resin during the molding process. Foam core 103 for floor 100 may also be formed from a plurality of foam blocks wrapped with fiber material and impregnated with the selected resin during the molding process.

For some applications foam core 93 for end walls 82 and 84 may also include a plurality of foam blocks similar to foam blocks 53 or 103 which have been wrapped with fiber material and impregnated with the selected resin during the molding process. Foam core 123 for roof 120 may also be formed from a plurality of foam blocks.

Alternatively, foam cores 53, 93, 103 and/or 123 may be formed from a grid of the selected foam material alternating with plies of the selected fiber material. The configuration of the layers of foam material and fiber material may be varied to provide the desired structural strength for the respective side walls 42 and 44, end walls 82 and 84, floor 100 and roof 120. FIGS. 7 and 8 show grid 86 of alternating foam material and plies of fiber material sandwiched between multiple layers of fiber material and infused with the selected resin to form end walls 82 and 84. The vertical and horizontal plies of fiber material may be continuous or discontinuous as desired for the selected end wall.

Corresponding interior surfaces 91 have at least one layer of fiber reinforced plastic and corresponding exterior surfaces 92 also has at least one layer of fiber reinforced plastic. For one application two plies of fiber material were used to form interior surface 91 and exterior surface 92. The fiber materials within the grid are infused with resin to form a web of fiber reinforced plastic layers encapsulating the foam material. For one application end walls 82 and 84 have been formed with this grid configuration having continuous horizontal plies of fiber material and discontinuous vertical plies of fiber material. Side walls 42 and 44, floor 100 and roof 120 may also be formed with a similar grid configuration if desired.

For some applications, the resulting composite box structure 30 may be painted or covered with coating materials that reflect solar energy from the sun. For example, a coating material containing ceramic fibers (not expressly shown) can be applied to the exterior surfaces of composite box structure 30 to significantly reduce the amount of heat absorbed from ultraviolet rays and infrared rays. By using such coating materials, the thickness of foam cores 53, 93, 103 and/or 123 may be reduced while maintaining the same level of insulation or the effectiveness of the insulation may be increased for the same thickness of foam cores. For some applications the coating material may be applied as part of the resin infusion process. For other applications the coating material may be applied after fabrication of composite box structure 30 has been completed. Coating systems with various ceramic fibers are available from Energy Research Center in Houston, Tex. Also, 3M Company has available various types of thin film or sheet material that may be applied to the exterior of composite box structure 30 to reflect solar energy.

During the molding process a generally rectangular opening 46 is formed in each side wall 42 and 44 intermediate the ends of the respective side walls 42 and 44. Door 180 is slidably mounted on each side wall 42 and 44 adjacent to the respective opening 46 for use in controlling access to interior 32 of railway boxcar 20. The height of each opening 46 preferably extends from floor 100 to the adjacent edge of second composite unit or roof 120. The center of each opening 46 corresponds approximately with the midpoint in the respective side wall 42 and 44. For one application each opening 46 has a height of approximately nine feet six inches which corresponds to the height of the respective side walls 42 and 44 between adjacent portions of floor 100 and roof 120.

Each door 180 has a first position blocking the respective opening 46 to form a thermal barrier between hollow interior 32 and the exterior of railway boxcar 20. Each door 180 also has a second position which allows access to hollow interior 32 of railway boxcar 20 through the respective openings 46. A pair of door stops 181 and 182 are preferably mounted on the exterior of each side wall 42 and 44 to limit the longitudinal movement of the respective door 180 from its first position to its second position. In FIG. 1A, door 180 is shown slidably mounted on upper track 194 and lower track 196 intermediate its first position which blocks opening 46 and its second position in which edge 183 of door 180 contacts its respective door stops 181 and 182. For some application, doors 180 may be formed from the same composite materials as composite box structure 30.

As shown in FIGS. 1A and 1B, railway car underframe 200 includes a pair of railway trucks 202 and 204 located adjacent to each end of railway boxcar 20. Safety equipment such as ladders 206 and hand brake 208 are attached to railway car underframe 200 with no connections or attachments to composite box structure 30. Standard railway couplings 210 are also provided at each end of railway car underframe 200. Each coupling 210 preferably includes end of car cushioning unit 212 disposed between each end of center sill 214 and the respective coupling 210. One of the technical benefits of the present invention includes the ability to add end of car cushioning units 212 having different lengths of travel, depending upon the intended application for the resulting railway boxcar 20. For some applications, cushioning units 212 may have a length of travel of approximately fifteen (15) inches. For other applications, cushioning units 212 may have a length of travel of approximately eighteen (18) inches or more.

Figure 2C:
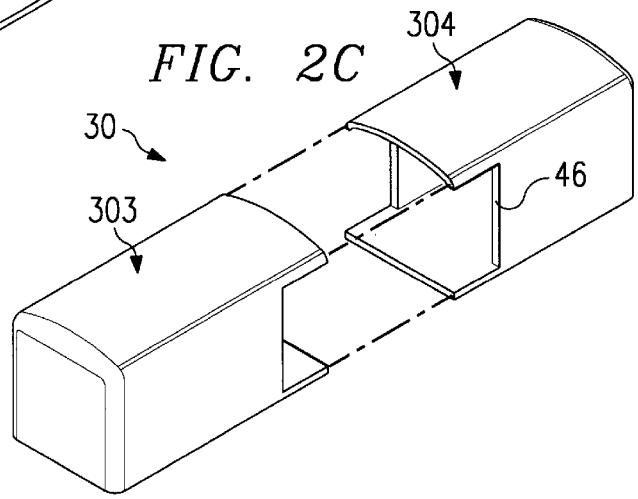
Figure 2D:
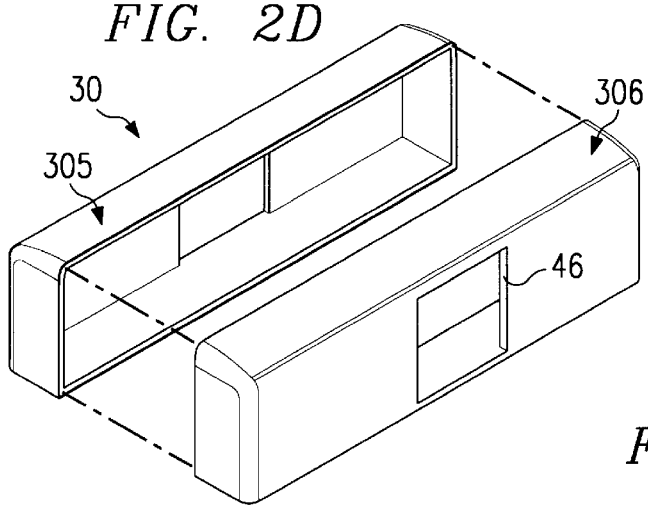
Figure 2E:
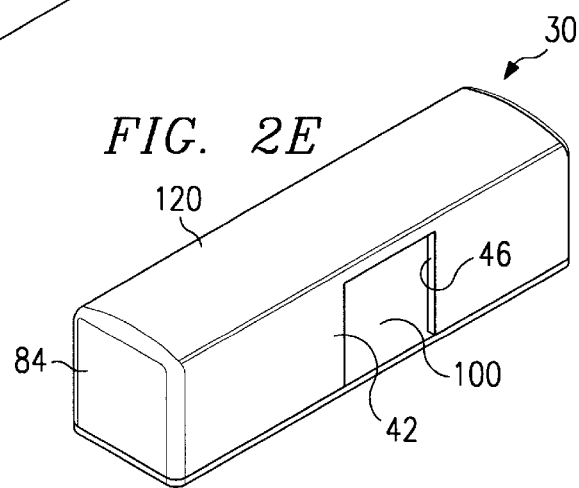
FIG. 2E is a schematic drawing showing an isometric view of a box structure in the form of a single integrally molded fiber reinforced composite unit.

FIGS. 2B, 2C and 2D show alternative configurations of a first fiber reinforced composite unit and a second fiber reinforced composite unit which may be attached to each other to form composite box structure 30. In FIG. 2B, side walls 42 and 44, end walls 82 and 84 and roof 120 have been integrally molded with each other to form first fiber reinforced composite unit 301. Second fiber reinforced composite 302 is provided to form floor 100 for the resulting composite box structure 30.

In FIG. 2C, first fiber reinforced composite unit 303 and second composite unit 304 have been formed with substantially identical dimensions and configurations. First composite unit 303 and second composite unit 304 are essentially mirror images of each other which correspond to one-half of composite box structure 30. Therefore, the same closed mold may be used to form first fiber reinforced composite unit 303 and second fiber reinforced composite unit 304. Composite box structure 30 may be formed by attaching first composite unit 303 with second composite unit 304.

FIG. 2D shows first fiber reinforced composite unit 305 and second fiber reinforced composite unit 306 which also have substantially identical dimensions and configurations corresponding to cutting composite box structure 30 along its longitudinal centerline. Thus, first fiber reinforced composite unit 305 and second fiber reinforced composite 306 may be formed in the same closed mold. First fiber reinforced composite unit 305 and second fiber reinforced composite unit 306 may be attached to each other to form composite box structure 30 as shown in FIG. 2D.

Figure 3:
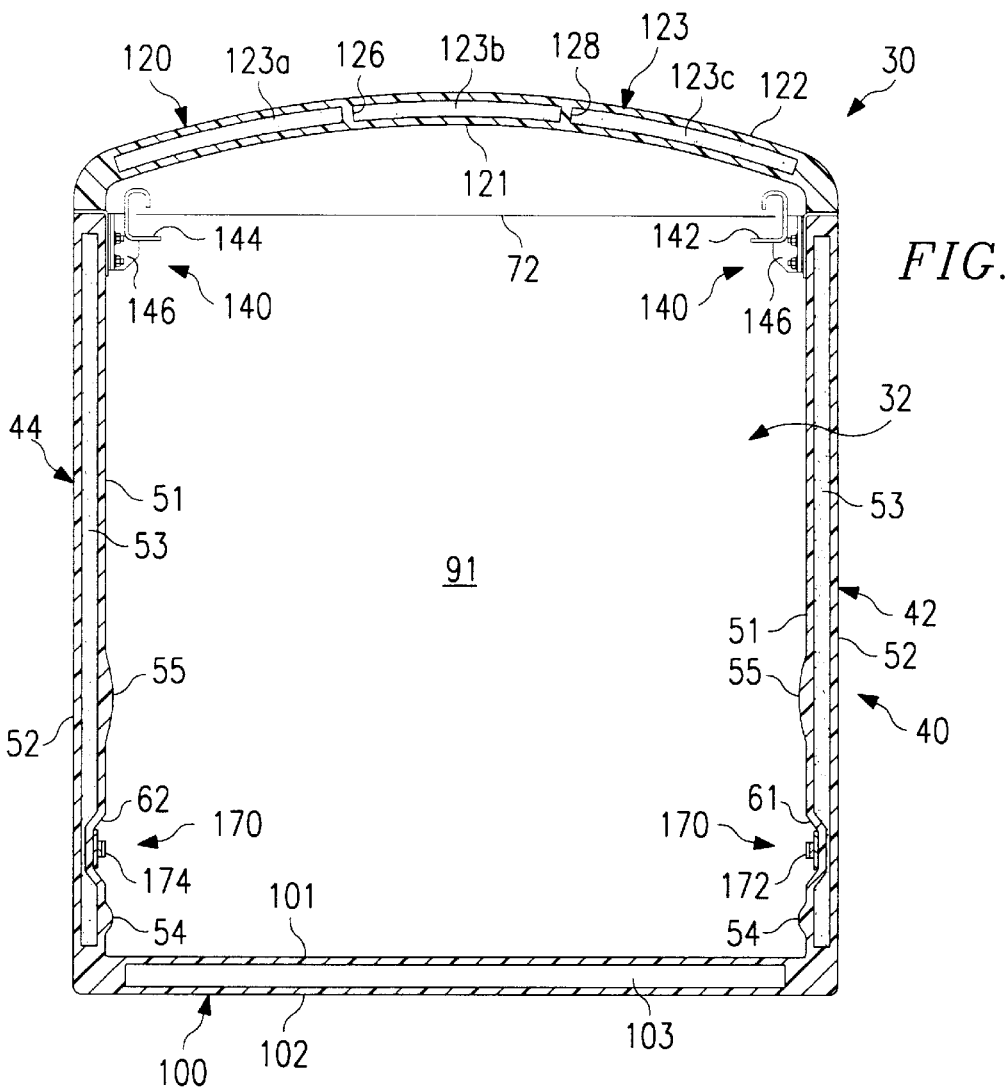
FIG. 3 is a schematic drawing in section with portions broken away showing an interior view of a composite box structure incorporating one embodiment of the present invention.

For one application composite box structure 30 is formed by mounting roof 120 on end walls 82 and 84 and side walls 42 and 44 opposite from floor 100 to define hollow interior 32. For purpose of illustration, line 72 is shown in FIGS. 1 and 3 to represent the seam or joint between roof 120 and first fiber reinforced composite unit 40. Normally, seam or joint 72 between roof 120 and first composite unit 40 will be sealed and covered using conventional fiberglass fabrication techniques such that seam 72 is not visible on either the interior or the exterior of composite box structure 30. Adhesive bonding around the full perimeter of seam 72 will provide a strong, water tight seal between roof 120 and first fiber reinforced composite unit 40.

Roof 120 has a generally rectangular configuration with a length corresponding approximately to the length of side walls 42 and 44 and the length of floor 100. The width of roof 120 corresponds approximately to the width of end walls 82 and 84 and the width of floor 100. As shown in FIG. 3, interior surface 121 of roof 120 has a generally concave configuration and exterior surface 123 has a generally corresponding convex configuration. For one application, roof 120 may have an overall inside radius of approximately thirteen feet four inches with an interior radius of approximately three inches and an exterior radius of eight inches around the perimeter of roof 120.

Figure 10:
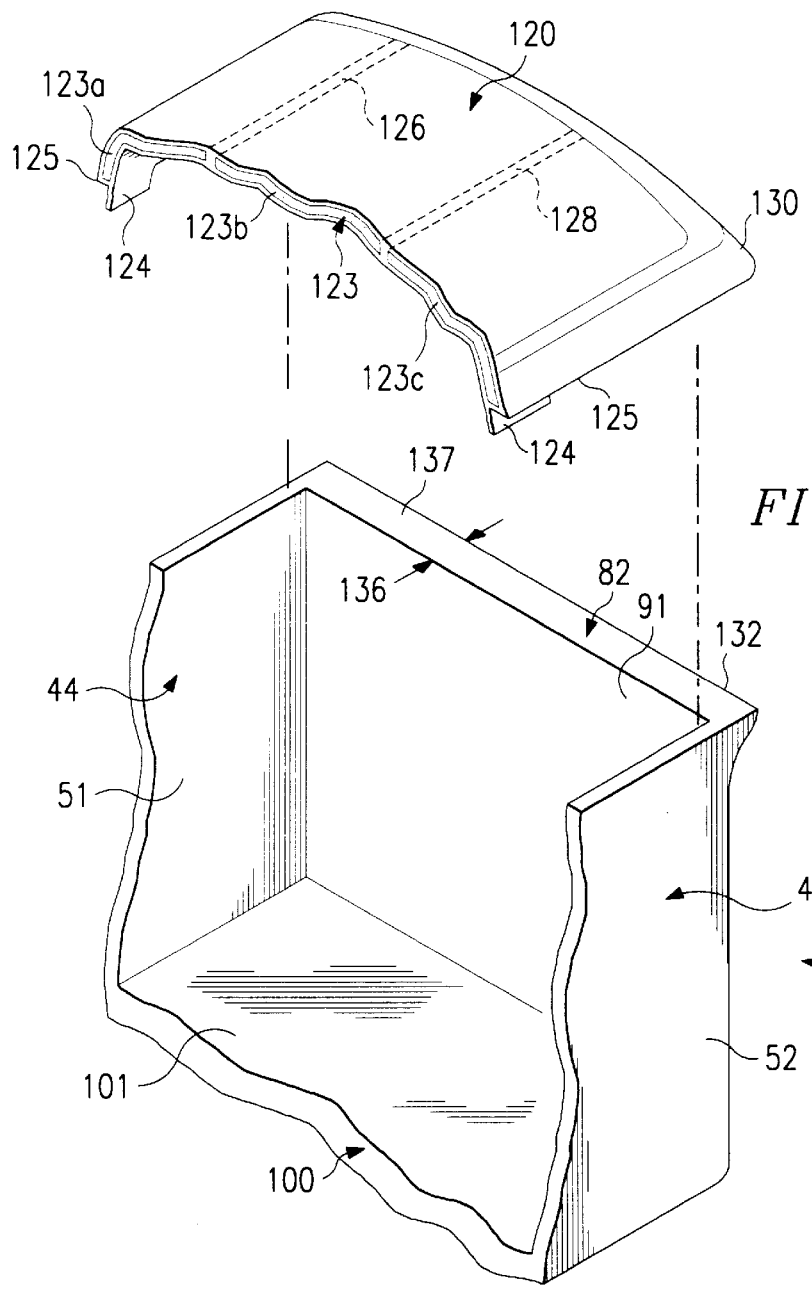
FIG. 10 is a schematic drawing in section and in elevation with portions broken away showing an exploded view of a first fiber reinforced composite unit being installed on a second fiber reinforced composite unit in accordance with one aspect of the present invention.

As shown in FIGS. 3 and 10, foam core 123 of roof 120 is divided by fiber reinforced plastic layers 126 and 128 into three longitudinal sections 123a, 123b and 123c. Fiber reinforced plastic layers 126 and 128 are preferably disposed on opposite sides of the longitudinal centerline of roof 120 and extend over the full length of roof 120. Fiber reinforced plastic layers 126 and 128 provide structural strength for roof 120 while at the same time allowing for limited flexing and/or twisting of roof 120 during movement of the associated railway car 20. Fiber reinforced plastic layers 126 and 128 function as longitudinal stiffeners for roof 120.

For some applications, flanges 124 are formed along longitudinal edges 125 and extend from interior surface 121. Each flange 124 is sized to engage a portion of the interior surfaces of the respective side walls 42 and 44 when roof 120 is attached to end walls 82 and 84 and side walls 42 and 44. Metal supporting plates (not expressly shown) may be integrally molded in side walls 42 and 44 for attachment with respective flanges 124.

As shown in FIG. 3, upper load divider track assembly 140 includes a pair of tracks 142 and 144 with portions of each track mounted on and disposed between the respective side walls 42 and 44 and roof 120. A plurality of bracket assemblies 146 are used to secure tracks 142 and 144 on interior surface 51 of the respective side walls 42 and 44 adjacent to interior surface 121 of roof 120.

Portions of lower load divider track assembly 170 are also shown in FIG. 3 having a pair of tracks 172 and 174 disposed respectively within first longitudinal recess 61 and second longitudinal recess 62. First longitudinal recess 61 is formed in interior surface 51 of side wall 42 located above interior surface 101 of floor 100. Second longitudinal recess 62 is formed within interior surface 51 of side wall 42 located above interior surface 101 of floor 100. Tracks 172 and 174 extend generally parallel with each other, tracks 142 and 144 and floor 100.

For some applications, all or a portion of layers 51, 52, 91, 92, 121 and 122 may be formed from two or more plies of fiber material (not expressly shown). For example, three or four plies of fiber material may be used to form reinforced strike zones 54 and 55 as part of interior surface 51 adjacent to and extending longitudinally parallel with floor 100. Strike zones 54 and 55 provide increased resistance to damage caused by freight contacting inside surface 51 of the respective sidewalls 42 and 44. The thickness of strike zones 54 and 55 as shown in FIG. 3 is exaggerated for the purpose of illustration. One of the technical benefits of the present invention includes providing multiple plies of fiber material to reinforced selected portions of either the interior surface or the exterior surface of composite box structure 30.

Figure 4:
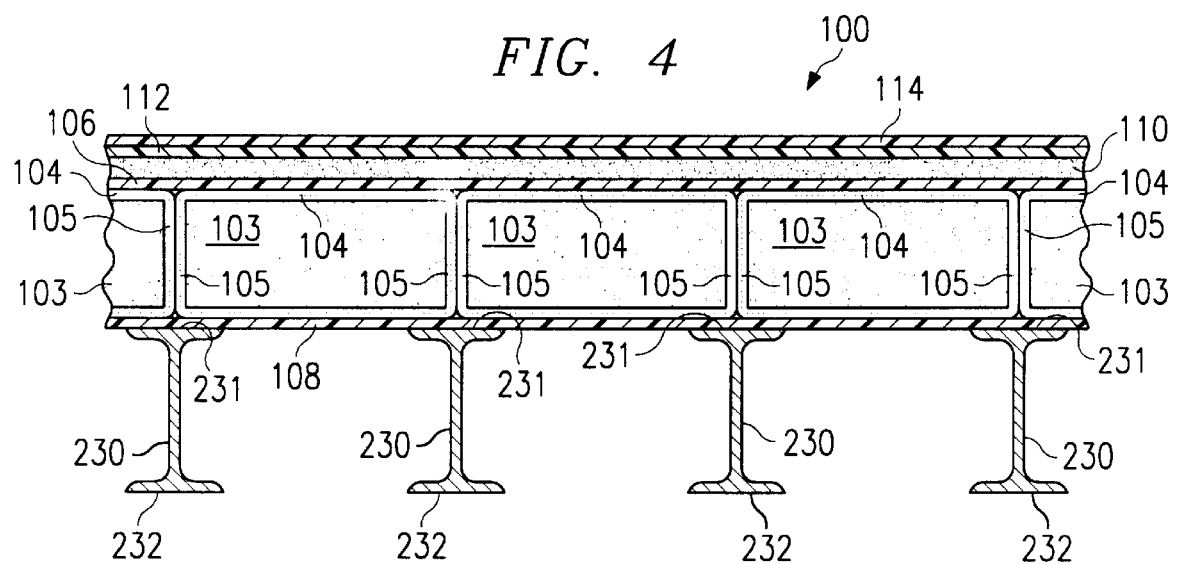
FIG. 4 is a schematic drawing in section with portions broken away showing a floor with a foam core and multiple plies of fiber material in accordance with one aspect of the present invention.
Figure 5:
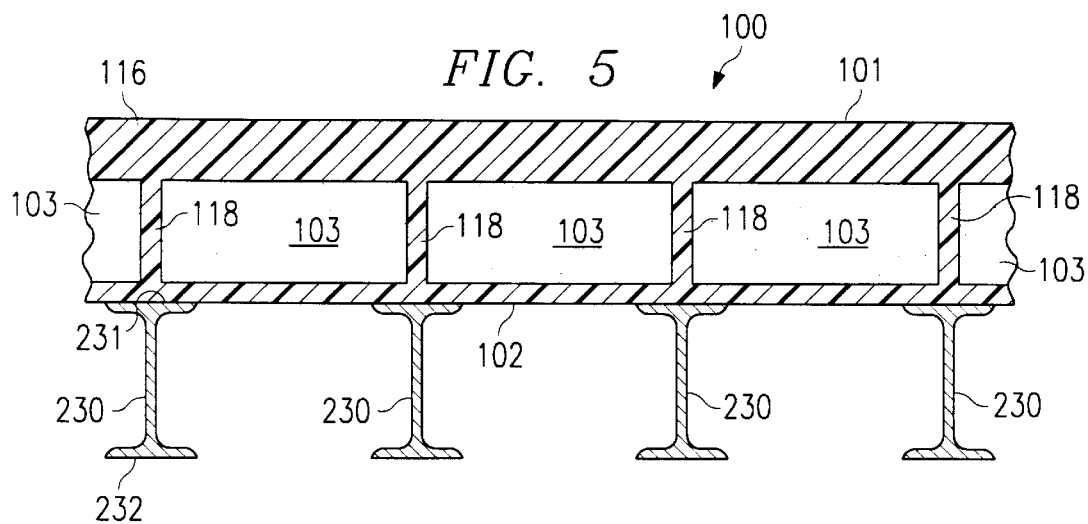
FIG. 5 is a schematic drawing in section with portion broken away showing the floor of FIG. 4 after the fiber material has been infused with a selected resin.

For some applications railway car underframe 200 preferably includes a plurality of longitudinal stringers 230. Each longitudinal stringer 230 has a first surface 231 and a second surface 232. Portions of exterior surface 102 of floor 100 of composite box structure 30 may be adhesively bonded with first surfaces 231 of longitudinal stringers 230. FIGS. 4 and 5 are schematic representations showing portions of floor 100 disposed on longitudinal stringers 230.

For purposes of illustrating various aspects of the present invention, a portion of floor 100 is shown in FIG. 4 as they would appear without having first been infused with a selected resin. Normally, composite box structure 30 is only mounted on railway car underframe 200 after completion of the molding process which includes infusion with the selected resin.

As illustrated in FIG. 4, floor 100 preferably includes a plurality of foam blocks 103 which have each been wrapped with one or more plies of fiber material 104. During the molding process, foam blocks 103 are disposed adjacent to each other and extend over the length and width of floor 100. This configuration results in vertical plies 105 of fiber material disposed between adjacent foam blocks 103 extending longitudinally along the length of floor 100. First ply 106 of fiber material is disposed on the interior portions of foam blocks 103. A second ply 108 of fiber material is disposed on the exterior of foam blocks 103.

For some applications, floor 100 could then be formed by infusing or molding first ply 106, fiber layers 104 and second ply 108 with the selected resin. The use of vacuum bagging techniques and dry layup of the selected core materials and multiple layers of the selected fiber material allow varying the cross section associated with floor 100 depending upon the specific application in which the resulting railway boxcar 20 will be used.

For many applications, foam blocks 103 will not carry compression and shear forces associated with placing a heavy load such as a forklift moving cargo on interior surface 101 of floor 100. Thus, layer 110 of a felt type material such as polyester is preferably placed on first fiber ply 106 along with two additional plies 112 and 114 of fiber material. The configuration of felt type material 110 and multiple plies of fiber material 104, 106, 112 and 114 results in providing a thick layer 116 of fiber-reinforced plastic extending over the length and width of interior surface 101 of floor 100.

The width of foam blocks 103 is preferably selected to be approximately equal to the distance between the centerline of adjacent longitudinal stringers 230. Thus, vertical layers 105 of fiber material are located within floor 100 at a position corresponding approximately with the position of respective longitudinal stringer 230 in railway car underframe 200. Infusion of fiber material plies 104, 106 108, 112 and 114 along with felt layer 110 results in forming a continuous web of fiber reinforced plastic which encapsulates foam blocks 103. Thus, any loads placed on interior surface 101 of floor 100 are transmitted through thick layer 116 of fiber reinforced plastic to vertical layers 118 of fiber reinforced plastic and onto the respective longitudinal stringer 230 to provide the desired load carrying capacity for floor 100.

Plies of fiber material 104, 106, 108, 112 and 114 may be formed from the same types of material. Alternatively, plies 104, 106, 108, 112 and 114 may be formed from different types of fiber material to provide the desired strength for floor 100. When the fiber plies are infused with the selected resin, the resulting structure is a thick, continuous web of fiber reinforced plastic 116 and 118 as shown in FIG. 5. As shown in FIGS. 2A and 3, fiber reinforced plastic interior surface 101 of floor 100 provides a generally smooth, continuous, flush surface with no indentations or openings which allows for easier cleaning. For one application floor 100 has a thickness of approximately six inches.

FIG. 6 shows a portion of side wall 44 and floor 100 adjacent to the respective opening 46. This portion of wall 42 has been formed by wrapping a plurality of foam blocks 53 with the selected fiber material. During the molding process, foam blocks 53 are placed in a closed mold between a first ply of fiber material and a second ply of fiber material. For some applications, multiple plies of fiber materials may be used to wrap foam blocks 53 and multiple layers of fiber material may be disposed on what will eventually become the interior surface 51 and the exterior surface 52 of wall 42. The fiber material plies are then impregnated with the selected resin to form a continuous web of fiber-reinforced plastic layers between adjacent foam blocks and fiber-reinforced plastic layers 51 and 52. As shown in FIGS. 5, 6, 9, and 12, the closed molding system and infusion of resin results in a continuous web of fiber-reinforced plastic. For some application foam blocks 53 may be coated or treated to prevent foam blocks 53 from absorbing or being infused with the selected resin. Side wall 44 has a similar cross section.

For some applications end walls 82 and 84 along with roof 120 and floor 100 may also be formed from a plurality of foam blocks encapsulated in layers of fiber reinforced plastic. One of the technical advantages of the present invention includes the ability to select various types of foam and fiber materials and to vary the configuration of these materials to enhance the performance of the resulting composite box structure 30.

For example, the thickness of foam core 53 is substantially reduced in section 48 of side wall 44 immediately adjacent to opening 46. Three or four plies of fiber material may be used to form section 48 of side wall 44 to provide more strength and resistance to wear at opening 46. The reduced thickness of section 48 allows installation of door 180 and the associated vertical portion of door frame 190. A portion of one of the vertical support beams 56 which are preferably formed in each side wall 44 and 42 is shown in FIG. 6.

During movement of railway car 20, freight placed within hollow interior 32 may tend to shift. Considerable force may be applied to end walls 82 and 84 by such shifting while starting and stopping movement of the associated railway boxcar 20. FIGS. 7, 8, 9, 10 and 11 show various features of the present invention which result in strengthening the connection between side walls 42 and 44, end walls 82 and 84, floor 100 and roof 120. For purposes of illustration fiber reinforced plastic layer associated with interior surface 91 is shown broken away in FIG. 7.

To increase the strength of the integrally molded connections between end wall 82 and adjacent portions of side walls 42 and 44, a plurality of end supporting layers (not expressly shown) of fiber reinforced plastic may be formed to extend from vertical support beam 56 in side wall 44 through end wall 82 to a corresponding vertical support beam 56 in side wall 42. During the molding process, one or more plies of fiber material may be placed within side walls 42 and 44 and extending through end wall 82 to provide the desired end supporting layers. As part of the molding process respective ends of the plies of fiber materials which will eventually become the end supporting layers are preferable placed in close contact with the plies of fiber material which will eventually become vertical support beam 56. As previously noted during the resin infusion process, a continuous web of fiber reinforced plastic is formed in each of the plies of fiber material associated with side walls 42 and 44 and end walls 82. Thus, any forces applied to the end supporting layers and end wall 82 will be transmitted to the respective vertical support beams 56 and side walls 42 and 44 in shear.

End supporting layers may be incorporated as part of end wall 82 having either foam blocks or a grid of alternating layers of foam and fiber material as shown in FIG. 7. U.S. Pat. No. 5,052,906 shows examples of using multiple layers of fiber material and a grid type resin distribution system which may be satisfactorily used to form end wall 82.

During the molding process, corner 58 is formed between the adjacent edges of side wall 42 and end wall 82. Corner 60 is formed between the end of side wall 44 and end wall 82. For one application, the exterior surface at corners 58 and 60 has a radius of approximately three inches. The interior surfaces at corners 58 and 60 intersect at approximately a ninety degree (90°) angle. The longitudinal distance between vertical supporting beams 56 and the respective corners 58 and 60 may be approximately twenty-four inches.

As previously noted, considerable force may be applied to end walls 82 and 84 during movement of the associated railway boxcar 20. To compensate for this force, flexible joint 88 as shown in FIG. 8 is preferably integrally molded between and extending from each end of floor 100 and the respective end walls 82 and 84. For the example show in FIG. 8, end wall 82 is longitudinally spaced from the end of floor 100 with a relatively thick layer 90 of fiber reinforced plastic extending between floor 100 and end wall 82. For some applications layer 90 may have a thickness which is more than twice the normal thickness of fiber reinforced plastic layers 91 and 92 of end wall 82. For one application seven plies of fiber material have been used to form layer 90 and five plies of fiber material to form a portion of exterior layer 92 adjacent thereto. A block of filler material 96 may be disposed in the offset formed between the end of floor 100 and end wall 82 to provide a smooth, aerodynamic configuration. Block 96 is preferably not encapsulated with fiber reinforced plastic during the molding process.

FIG. 9 shows flexible joint 68 which has been integrally molded between and extending from end wall 82 and side wall 44 at corner 60. A similar flexible joint 68 is preferably integrally molded and extending between each end of side walls 42 and 44 and the respective end walls 82 and 84. For the example shown in FIG. 9, end wall 82 is longitudinally spaced from the end of side wall 44 with a relatively thick layer 70 of fiber reinforced plastic extending between side wall 44 and end wall 82. For some applications layer 70 has a thickness which is more than twice the normal thickness of fiber reinforced plastic layers 91 and 92 of end wall 82. For example layer 70 may be formed from four layers of fiber material while layers 91 and 92 are generally formed from only two layers of fiber material.

Block 76 of filler material may be disposed within the interior of composite box structure 30 in the offset formed between the end of side wall 44 and end wall 82. The dimensions of filler block 76 are selected to provide a smooth interior surface for composite box structure adjacent to corner 60. Filler blocks 76 are preferably not encapsulated with fiber reinforced plastic during the molding process.

For some applications a reinforcing beam (not expressly shown) may be located within the interior of composite box structure 30 at respective end walls 82 and 84 adjacent to roof 120. Each reinforcing beam may be coupled with the respective end wall 82 and 84 and the respective side walls 42 and 44. Each reinforcing beam may include a core encapsulated in one or more layers of fiber reinforced plastic. For one application the reinforcing beam is formed using a balsa core. During the molding process, tabs of fiber reinforced plastic may be formed to extend from the reinforcing beam. The tabs are sized to fit between the upper edge of end walls 82 and side walls 42 and 44 and the corresponding edges of roof 120. The reinforcing beam is preferably sized to fit between first fiber reinforced composite unit 40 and second fiber reinforced composite unit 120.

Figure 11:
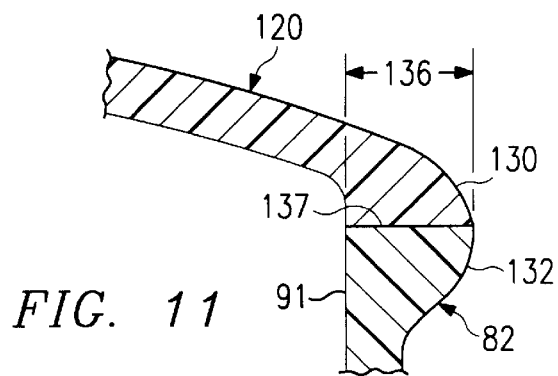
FIG. 11 is a schematic drawing in section with portions broken away showing one embodiment for attaching the roof and end wall of FIG. 10.

For the embodiment as shown in FIGS. 10 and 11 end 130 of roof 120 and the adjacent portion 132 of end wall 82 may have a substantially increased thickness 136. The exterior surface of end 130 and the adjacent portion 132 preferably have matching curved surfaces selected to optimize the aerodynamic performance of the resulting composite box structure 30.

In FIG. 11 the joint or seam between roof 120 and end wall 82 is shown as relatively smooth matching surfaces 137. For some applications matching grooves or recesses (not expressly shown) may be formed in surfaces 137 to enhance the bonding or seal formed between roof 120 and end wall 82. Alternatively, surfaces 137 may extend at an angle other than horizontal as shown in FIG. 11. For some applications surfaces 137 may extend at an angle of 45° relative to interior surface 91 of end wall 82. These same techniques may be used to improve the seal between roof 120 and adjacent portions of side walls 42 and 44.

For some applications, the strength of side walls 42 and 44 may be substantially increased by forming a plurality of vertical supporting beams 56 during the molding process. As shown in FIGS. 6, 7, and 12 a first group of relatively large foam blocks 53 may be wrapped with fiber material. A second group of smaller foam blocks 156 may be wrapped with fiber material and disposed vertically between adjacent foam blocks 53. As shown in FIGS. 6, 7 and 12, the alternating configuration of first foam blocks 53 and second foam blocks 156 provides substantial strength for side walls 42 and 44. Infusing the fiber material on the exterior of the first group of foam blocks and the fiber material on the exterior of the second group of foam blocks forms a continuous web of fiber reinforced plastic layers with vertical layers 158 of fiber reinforced plastic extending between interior surface 51 and exterior surface 52.

For some applications interior surface or first layer 51 of fiber reinforced plastic is preferably formed from at least two plies of the selected fiber material adjacent to each vertical support beam 56. Exterior surface or second layer 52 of fiber reinforced plastic is preferably formed from at least three plies of the selected fiber material adjacent to each vertical support beam 56.

The following specifications are for railway boxcar 20 incorporating one embodiment of the present invention.

| | |
|---|---|
| Outside length | 68 feet 0 inches |
| Inside length | 67 feet 2 inches |
| Distance between centerline of railway trucks | 50 feet 0 inches |
| Outside width of composite box structure | 10 feet 0 inches |
| Inside width | 9 feet 2 inches |
| Height from rail to top of car | 15 feet 6 inches |
| Inside height from floor to roof | 11 feet ½ inch |
| Height of door opening | 9 feet 6½ inches |
| Width of door opening | 12 feet 0 inches |
| Internal volume with load dividers | 6,170 cubic feet |
| Internal volume without load dividers | 6,291 cubic feet |
| Light weight | 86,000 pounds |
| Nominal load carrying capacity | 200,000 pounds |
| Total gross rail load | 286,000 pounds |

Although the present invention and its advantages have been described in detail, it should be understood that various changes, substitutions and alterations can be made herein without departing from the spirit and scope of the invention as defined by the following claims.

What is claimed is:

1. A composite box structure for mounting on a railway car underframe to form an insulated railway boxcar comprising:

a pair of opposite side walls and a pair of opposite end walls extending between and joined with the side walls to define in part a hollow interior for the box structure;

a floor extending between and joined with the side walls and the end walls;

an opening formed in each side wall intermediate the end walls;

the side walls, the end walls, and the floor being a first fiber reinforced composite unit; and a roof formed as a second fiber reinforced composite unit, the roof being mounted on the end walls and the side walls opposite from the floor.

2. The composite box structure of claim 1 wherein the first fiber reinforced composite unit includes:

a plurality of blocks, each block being wrapped with a fiber material;

the blocks being disposed between a first layer of fiber material and a second layer of fiber material; and the fiber material wrapped on the blocks and the first layer of fiber material and the second layer of fiber material being impregnated with a resin to form a continuous web of fiber reinforced plastic interposed between each pair of adjacent blocks and fiber reinforced plastic layers on the interior and the exterior of the first fiber reinforced composite unit.

3. The composite box structure of claim 1 wherein the second fiber reinforced composite unit includes:

a plurality of foam blocks each foam block being wrapped with a fiber material;

the foam blocks being disposed between a first layer of fiber material and a second layer of fiber material; and the fiber material wrapped on the foam blocks and the first layer of fiber material and the second layer of fiber material being impregnated with a resin to form fiber reinforced plastic webs between each adjacent pair of foam blocks and an interior surface and an exterior surface of fiber reinforced plastic layer on the second fiber reinforced composite unit.

4. The composite box structure of claim 1 further comprising:

a plurality of foam blocks selected from the group consisting of urethane, polyurethane, styrene, polystyrene, and light metal foam;

material fibers selected from the group consisting of carbon, boron, graphite, glass and aramid; and a resin selected from the group consisting of epoxy, polyester, vinylester and vinyl.

5. The composite box structure of claim 1 wherein the first fiber reinforced composite unit further includes a plurality of blocks, each block being encapsulated in fiber reinforced plastic.

6. The composite box structure of claim 1 wherein:

the floor is formed in part from a plurality of blocks covered with multiple plies of fiber material;

each end wall has a core disposed between plies of fiber material;

the fiber material of the floor and the end walls is impregnated with a resin to form continuous layers of fiber reinforced plastic; and each end wall is spaced longitudinally from the respective end of the floor with a layer of fiber reinforced plastic extending therebetween to allow limited movement of the respective end wall relative to the floor.

7. The composite box structure of claim 6 wherein the respective fiber reinforced plastic layer joining each end wall with the floor has a thickness substantially greater than the thickness of the fiber reinforced plastic layers associated with the respective end wall.

8. The composite box structure of claim 1 wherein:

each side wall is formed in part from a plurality of blocks covered with plies of fiber material; each end wall has a foam core with fiber material disposed therein;

the fiber material of the side wall and the end walls is impregnated with a resin to form continuous layers of the reinforced plastic; and each end wall is spaced longitudinally from the respective end of the side walls with a layer of fiber reinforced plastic interposed therebetween to allow limited movement of the respective end wall relative to the side walls.

9. The composite box structure of claim 8 wherein the fiber reinforced plastic layers joining each end wall with the side walls has a thickness substantially greater than the thickness of the fiber reinforced plastic layers associated with the respective end wall.

10. The composite box structure of claim 1 wherein each side wall includes:

a plurality of first foam blocks wrapped with fiber material;

the first foam blocks being spaced apart longitudinally with respect to each other to form portions of the respective side wall;

a plurality of second foam blocks wrapped with fiber material and disposed vertically between adjacent pairs of first foam blocks to provide internal vertical support beams for the respective side wall;

a first layer of fiber material disposed on the exterior of the foam blocks and a second layer of fiber material disposed on the interior of the foam blocks;

the fiber material being impregnated with a resin.

11. The composite box structure of claim 1 wherein the floor includes:

a plurality of foam blocks wrapped with fiber material and disposed adjacent to each other over the length and width of the floor;

a first layer of fiber material disposed on the interior of the foam blocks and a second layer of fiber material disposed on the exterior of the foam blocks;

a layer of felt material disposed on the first layer of fiber material with two or more additional layers of fiber material disposed on the felt material opposite from the second layer of fiber material;

the fiber material being impregnated with a resin to form a continuous web of fiber reinforced plastic layers encapsulating the foam blocks and forming a fiber reinforced plastic interior surface and a fiber reinforced plastic exterior surface for the floor.

12. A composite box structure for mounting on a railway car underframe to form an insulated railway boxcar comprising:

a pair of opposite side walls and a pair of opposite end walls extending between and joined with the side walls at respective ends of each side wall;

a floor extending between and joined with the side walls and the end walls;

the side walls, the end walls and the floor cooperating with each other to define in part a hollow interior for the composite box structure;

the side walls, the end walls and the floor each having an exterior surface which defines in part a corresponding exterior surface of the composite box structure;

the side walls, the end walls and the floor each having an interior surface which defines in part a corresponding interior surface of the composite box structure;

an opening formed in each side wall intermediate the end walls with each opening and having a height corresponding approximately with the height of each side wall;

the side walls, the end walls and the floor being integrally molded with each other to form a first fiber reinforced composite unit; and a roof formed as a second fiber reinforced composite unit with dimensions corresponding to the end walls and the side walls to allow attaching the roof to the end walls and the side walls opposite from the floor.

13. The composite box structure of claim 12 wherein:

the interior surface of each side wall, end wall and floor is a layer of fiber reinforced plastic;

the exterior surface of each side wall, end wall and floor is a layer of fiber reinforced plastic; and each side wall, end wall and floor has a foam core between the layers of fiber reinforced plastic.

14. The composite box structure of claim 12 wherein each end wall includes:

a grid of foam material alternating with layers of fiber reinforced plastic;

the interior surface having a layer of fiber reinforced plastic and the exterior surface having a layer of fiber reinforced plastic with the grid of foam material and fiber reinforced plastic layers encapsulated therebetween.

15. The composite box structure of claim 12 wherein the roof includes:

an exterior surface which defines in part a corresponding exterior surface of the composite box structure;

an interior surface which defines in part a corresponding interior surface of the composite box structure;

the interior surface of the roof being formed from fiber reinforced plastic;

the exterior surface of the roof being formed from fiber reinforced plastic;

and the roof having a foam core encapsulated with fiber reinforced plastic.

16. The composite box structure of claim 12 wherein:

the roof has a generally rectangular configuration with a length corresponding approximately to the length of the side walls and a width corresponding approximately to the width of the end walls;

the roof has an interior surface formed from fiber reinforced plastic;

a plurality of flanges extend from the interior surface of the roof; and each flange is sized to engage a portion of the interior surface of the respective side walls when the roof has been attached to the end walls and the side walls.

17. A composite box structure for mounting on a railway car underframe to form an insulated railway boxcar comprising:

a pair of opposite side walls and a pair of opposite end walls extending between and joined with the side walls at respective ends of each side wall;

a floor extending between and joined with the side walls and the end walls;

the side walls, the end walls, and the floor cooperating with each other to define in part a hollow interior for the box structure;

an opening formed in each side wall intermediate the end walls to allow access to the hollow interior;

the side walls, the end walls and the floor being integrally molded with each other to form a first fiber reinforced composite unit; and a roof formed as a second fiber reinforced composite unit;

the roof being mounted on the end walls and the side walls opposite from the floor;

the side walls, end walls and floor each having an interior surface formed from fiber reinforced plastic;

the side walls, end walls and floor each having an exterior surface formed from fiber reinforced plastic; and the side walls, end walls and floor each having a foam core encapsulated with fiber reinforced plastic.

18. The composite box structure of claim 17 wherein the roof includes:

a foam core divided into three sections by two fiber reinforced plastic layers;

the two fiber reinforced plastic layers extending longitudinally parallel with a longitudinal centerline of the roof.

19.

20. The composite box structure of claim 17 wherein:

each end wall is spaced longitudinally from the respective end of the floor;

a flexible joint is integrally molded between and extends from each end of the floor and the respective end wall;

the flexible joint having at least one layer of fiber reinforced plastic integrally molded between the respective end of the floor and the respective end wall.

21. The composite box structure of claim 17 wherein:

each side wall is spaced longitudinally from the respective end of the floor;

a flexible joint is integrally molded between and extends between each end of the floor and the respective side wall; and the flexible joint having at least one layer of fiber reinforced plastic integrally molded between the respective end of the floor and the respective side wall.

22. The composite box structure of claim 17 wherein:

a flexible joint is integrally molded with and extends between each end of the floor and the respective end wall;

a flexible joint is integrally molded with and extends between each end of each side wall and the respective end wall; and a block of filler material is disposed on the exterior of the composite box structure adjacent to each flexible joint between the floor and the end walls to provide a uniform flush exterior for the composite box structure at the respective flexible joint.

23. The composite box structure of claim 17 wherein the floor includes:

a plurality of foam blocks wrapped with fiber material and disposed adjacent to each other over the length and width of the floor;

a layer of fiber material disposed vertically between adjacent foam blocks and each vertical layer extending longitudinally along the length of the floor;

a first layer of fiber material disposed on the interior of the foam blocks and a second layer of fiber material disposed on the exterior of the foam blocks;

a layer of felt material disposed on the first layer of fiber material with at least two additional layers of fiber material disposed on the felt material opposite from the first layer of fiber material;

the fiber material being impregnated with a resin to form vertical layers of fiber reinforced plastic between adjacent blocks and between the fiber reinforced plastic interior surface and exterior surface of the floor, each vertical layer of fiber reinforced plastic in the floor being located such that it is adapted to be positioned substantially vertically above a corresponding longitudinal stringer of a railway car underframe so that loads placed on the floor are transmitted through the vertical layers of fiber reinforced plastic to the longitudinal stringers.

24. A composite box structure for mounting on a railway car underframe to form an insulated railway boxcar comprising:

a pair of opposite side walls and a pair of opposite end walls extending between and joined with the side walls at respective ends of each side wall;

a floor extending between and joined with the side walls and the end walls;

a roof extending between and joined with the side walls and the end walls opposite from the floor;

the side walls, the end walls, the floor and the roof cooperating with each other to define in part a hollow interior for the box structure;

a generally rectangular opening formed in each side wall intermediate the end walls to allow access to the hollow interior;

the side walls, the end walls, the floor and the roof each having an interior surface which defines in part a corresponding interior surface of the composite box structure;

the side walls, the end walls, the floor and the roof each having an exterior surface which defines in part a corresponding exterior surface of the composite box structure;

the side walls, the end walls, the floor and the roof being integrally molded with each other to form a fiber reinforced composite unit having a foam core encapsulated with fiber reinforced plastic;

the interior surfaces of the side walls, the end walls, the floor and the roof being formed from fiber reinforced plastic; and the exterior surfaces of the side walls, the end walls, the floor, and the roof being formed from fiber reinforced plastic.

25. A composite box structure for mounting on a railway car underframe to form an insulated railway boxcar comprising:

a pair of opposite side walls and a pair of opposite end walls extending between and joined with the side walls at respective ends of each side wall;

a floor extending between and joined with the side walls and the end walls;

the side walls, the end walls, and the floor cooperating with each other to define in part a hollow interior for the box structure;

a generally rectangular opening formed in each side wall intermediate the end walls to allow access to the hollow interior;

the side walls, the end walls and the floor each having an interior surface which defines in part a corresponding interior surface of the composite box structure;

the side walls, the end walls and the floor each having an exterior surface which defines in part a corresponding exterior surface of the composite box structure;

the side walls, the end walls and the floor being integrally molded with each other to form a first fiber reinforced composite unit having a foam core encapsulated with fiber reinforced plastic;

the interior surfaces of the side walls, the end walls and the floor being formed from fiber reinforced plastic;

the exterior surfaces of the side walls, the end walls and the floor being formed from fiber reinforced plastic;

a roof molded as a second fiber reinforced composite structure having a foam core encapsulated with fiber reinforced plastic;

the roof having an interior surface which defines in part a corresponding interior surface of the composite box structure;

the roof having an exterior surface which defines in part a corresponding exterior surface of the composite box structure;

the interior surface and the exterior surface of the roof being formed from fiber reinforced plastic; and the roof being adhesively attached to the end walls and the side walls opposite from the floor.

26. A composite box structure for mounting on a railway car underframe to form an insulated railway boxcar comprising:

a pair of opposite side walls and a pair of opposite end walls extending between and joined with the side walls to define in part a hollow interior for the box structure;

a floor extending between and joined with the side walls and the end walls;

a roof integrally molded with the end walls and the side walls opposite from the floor;

an opening formed in each side wall intermediate the end walls; and the side walls, the end walls, the floor, and the roof being formed as an integrally molded fiber reinforced composite unit.

* * * * *

UNITED STATES PATENT AND TRADEMARK OFFICE
CERTIFICATE OF CORRECTION

Patent No.: 5,857,414
Dated: January 12, 1999
Inventor(s): Mell R. Thoman, et al.

It is certified that error appears in the above-identified patent and that said Letters Patent is hereby corrected as shown below:

Column 17, line 50; after "19", please insert --The composite box structure of Claim 17 wherein the fiber reinforced plastic interior surface of the floor provides a smooth, continuous, flush surface with no indentation or openings.--.

Signed and Sealed this

First Day of May, 2001

*Attest:*

NICHOLAS P. GODICI

*Attesting Officer*    Acting Director of the United States Patent and Trademark Office